(12) United States Patent
Ichinokawa

(10) Patent No.: US 11,105,651 B2
(45) Date of Patent: Aug. 31, 2021

(54) DISPLAY SYSTEM, DISPLAY CONTROL METHOD, AND STORAGE MEDIUM FOR FACILITATING DISPLAY OF A ROAD SHAPE BASED ON DETECTION OF A CHANGE

(71) Applicant: HONDA MOTOR CO., LTD., Tokyo (JP)

(72) Inventor: Jumpei Ichinokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/558,440

(22) Filed: Sep. 3, 2019

(65) Prior Publication Data
US 2020/0080864 A1  Mar. 12, 2020

(30) Foreign Application Priority Data

Sep. 11, 2018  (JP) .............................. JP2018-169675

(51) Int. Cl.
*G01C 21/36* (2006.01)
*B60R 1/00* (2006.01)
*G06K 9/00* (2006.01)

(52) U.S. Cl.
CPC ............ *G01C 21/3667* (2013.01); *B60R 1/00* (2013.01); *G06K 9/00791* (2013.01);
(Continued)

(58) Field of Classification Search
CPC ............ G01C 21/3667; G01C 21/3602; G01C 21/3658; B60R 1/00; B60R 2300/205; B60R 2300/207; B60R 2300/202; B60R 2300/107; B60R 2300/303; B60R 2300/408; B60R 2300/406; B60R 2300/804; B60R 2300/8086; B60R 2300/105; B60R 2300/301; B60K 2370/166; B60K 2370/21;
(Continued)

(56) References Cited

U.S. PATENT DOCUMENTS

2012/0191344 A1 * 7/2012 Iao ..................... G01C 21/3658
701/436
2014/0297181 A1 * 10/2014 Kondo ............... G01C 21/3658
701/532

(Continued)

FOREIGN PATENT DOCUMENTS

JP          5279904        9/2013

*Primary Examiner* — Maurice L. McDowell, Jr.
*Assistant Examiner* — Donna J. Ricks
(74) *Attorney, Agent, or Firm* — Amin, Turocy & Watson, LLP

(57) ABSTRACT

A display system includes a recognizer configured to recognize a surrounding situation of a vehicle, a display configured to display images, and a display controller configured to cause the display to display an image representing a road shape around the vehicle recognized by the recognizer, wherein, when a lane in which the vehicle can travel in the same direction as a travel direction of the vehicle is added, the display controller causes the display to display an image about the added lane outside the image representing the road shape on the side on which the lane is added before the display is caused to display an image representing a shape of the added lane.

15 Claims, 10 Drawing Sheets

(52) U.S. Cl.
CPC ... *B60R 2300/105* (2013.01); *B60R 2300/107* (2013.01); *B60R 2300/202* (2013.01); *B60R 2300/205* (2013.01); *B60R 2300/207* (2013.01); *B60R 2300/301* (2013.01); *B60R 2300/303* (2013.01); *B60R 2300/406* (2013.01); *B60R 2300/408* (2013.01); *B60R 2300/804* (2013.01); *B60R 2300/8086* (2013.01)

(58) Field of Classification Search
CPC .............. B60K 2370/193; B60K 35/00; G06K 9/00791; G06K 9/00798
See application file for complete search history.

(56) References Cited

U.S. PATENT DOCUMENTS

| | | | | |
|---|---|---|---|---|
| 2017/0341653 | A1* | 11/2017 | Kubota | B60W 30/18154 |
| 2019/0212749 | A1* | 7/2019 | Chen | B62D 15/0255 |
| 2019/0347939 | A1* | 11/2019 | Kim | G08G 1/167 |
| 2020/0209007 | A1* | 7/2020 | Sasaki | G08G 1/0969 |
| 2020/0217684 | A1* | 7/2020 | Okuyama | B60W 30/18163 |

* cited by examiner

DISPLAY SYSTEM, DISPLAY CONTROL METHOD, AND STORAGE MEDIUM FOR FACILITATING DISPLAY OF A ROAD SHAPE BASED ON DETECTION OF A CHANGE

CROSS-REFERENCE TO RELATED APPLICATION

Priority is claimed on Japanese Patent Application No. 2018-169675, filed Sep. 11, 2018, the content of which is incorporated herein by reference.

BACKGROUND

Field of the Invention

The present invention relates to a display system, a display control method, and a storage medium.

Description of Related Art

Conventionally, there is a driving assistance system which assists driving of a driver by displaying a route to a destination on a screen. With respect to this, there is a navigation system which presents road markings relating to a road segment in which a user moves, among all road markings presented on a display, on the display through a different method from a method of presenting the other road markings when a vehicle approaches a junction on a road network (for example, JP 5279904).

SUMMARY

However, when a vehicle does not approach a point at which road conditions change, a road shape according to the change is not displayed and thus there is a case in which a driver cannot check road conditions at an appropriate timing.

An object of an aspect of the present invention devised in view of the aforementioned circumstances is to provide a display system, a display control method, and a storage medium capable of allowing an occupant to check road conditions at a more appropriately timing.

A display system, a display control method and a storage medium according to the present invention employ the following configurations.

(1): A display system according to one aspect of the present invention includes: a recognizer configured to recognize a surrounding situation of a vehicle; a display configured to display images; and a display controller configured to cause the display to display an image representing a road shape around the vehicle recognized by the recognizer, wherein, when a lane in which the vehicle is able to travel in the same direction as a traveling direction of the vehicle is added, the display controller causes the display to display an image about the added lane outside the image representing the road shape on the side on which the lane is added before the display is caused to display an image representing a shape of the added lane.

(2): In the aforementioned aspect of (1), the image about the added lane may include an image of marking information associated with the added lane.

(3): In the aforementioned aspect of (1), the display system may further include a route determiner configured to determine a route to a destination of the vehicle, wherein the display controller displays the image about the added lane when the added lane is a recommended lane associated with the route to the destination determined by the route determiner.

(4): In the aforementioned aspect of (3), the display controller may set a lane neighboring the added lane as a target lane and display a guidance image for guiding lane change of the vehicle when the vehicle needs to move from a lane in which the vehicle is traveling to the added lane and an image representing the shape of the added lane is not displayed.

(5): In the aforementioned aspect of (4), the display controller may set a display start time of the guidance image for each lane on the basis of the number of lanes between a travel lane of the vehicle and the recommended lane, and when the vehicle has performed lane change after the guidance image has been displayed, continue display of the guidance image even when a display start time set in a lane after lane change has not been reached.

(6): In the aforementioned aspect of (5), the display controller may set the display start time for each lane on the basis of a lane change limit point that is a limit point for performing lane change to the recommended lane for each of a plurality of lanes in which the vehicle is able to travel in the same direction as the traveling direction of the vehicle.

(7): In the aforementioned aspect of (6), the display controller may end display of the guidance image when the vehicle is not traveling in the recommended lane during display of the guidance image and the vehicle has arrived at the lane change limit point.

(8): In the aforementioned aspect of (3), the display controller may cause the display to display an image representing that lane change of the vehicle is not necessary when the vehicle is traveling in the recommended lane.

(9): A display control method according to one aspect of the present invention is a display control method, using a computer, including: recognizing a surrounding situation of a vehicle; causing a display to display an image representing a recognized road shape around the vehicle; and when a lane in which the vehicle is able to travel in the same direction as a traveling direction of the vehicle is added, causing the display to display an image about the added lane outside the image representing the road shape on the side on which the lane is added before the display is caused to display an image representing a shape of the added lane.

(10): A storage medium according to one aspect of the present invention is a computer-readable non-transitory storage medium storing a program causing a computer to: recognize a surrounding situation of a vehicle; cause a display to display an image representing a recognized road shape around the vehicle; and when a lane in which the vehicle is able to travel in the same direction as a traveling direction of the vehicle is added, cause the display to display an image about the added lane outside the image representing the road shape on the side on which the lane is added before the display is caused to display an image representing a shape of the added lane.

According to the aforementioned (1) to (10), it is possible to allow an occupant to check road conditions at a more appropriately timing.

DESCRIPTION OF EMBODIMENTS

Hereinafter, an embodiment of a display system, a display control method, and a storage medium of the present invention will be described with reference to the drawings. In an embodiment, an example in which the display system is mounted in a vehicle including a driving assistance device such as an advanced driver assistance system (ADAS) and a navigation device which guides a route to a destination will be described. Driving assistance in an embodiment includes, for example, an adaptive cruise control system (ACC), a lane keeping assistance system (LKAS), a collision mitigation brake system (CMBS) and the like. Although cases in which the law of left-hand traffic is applied will be described hereinafter, the left and right sides may be changed when the law of right-hand traffic is applied.

[Overall Configuration]

Figure 1:
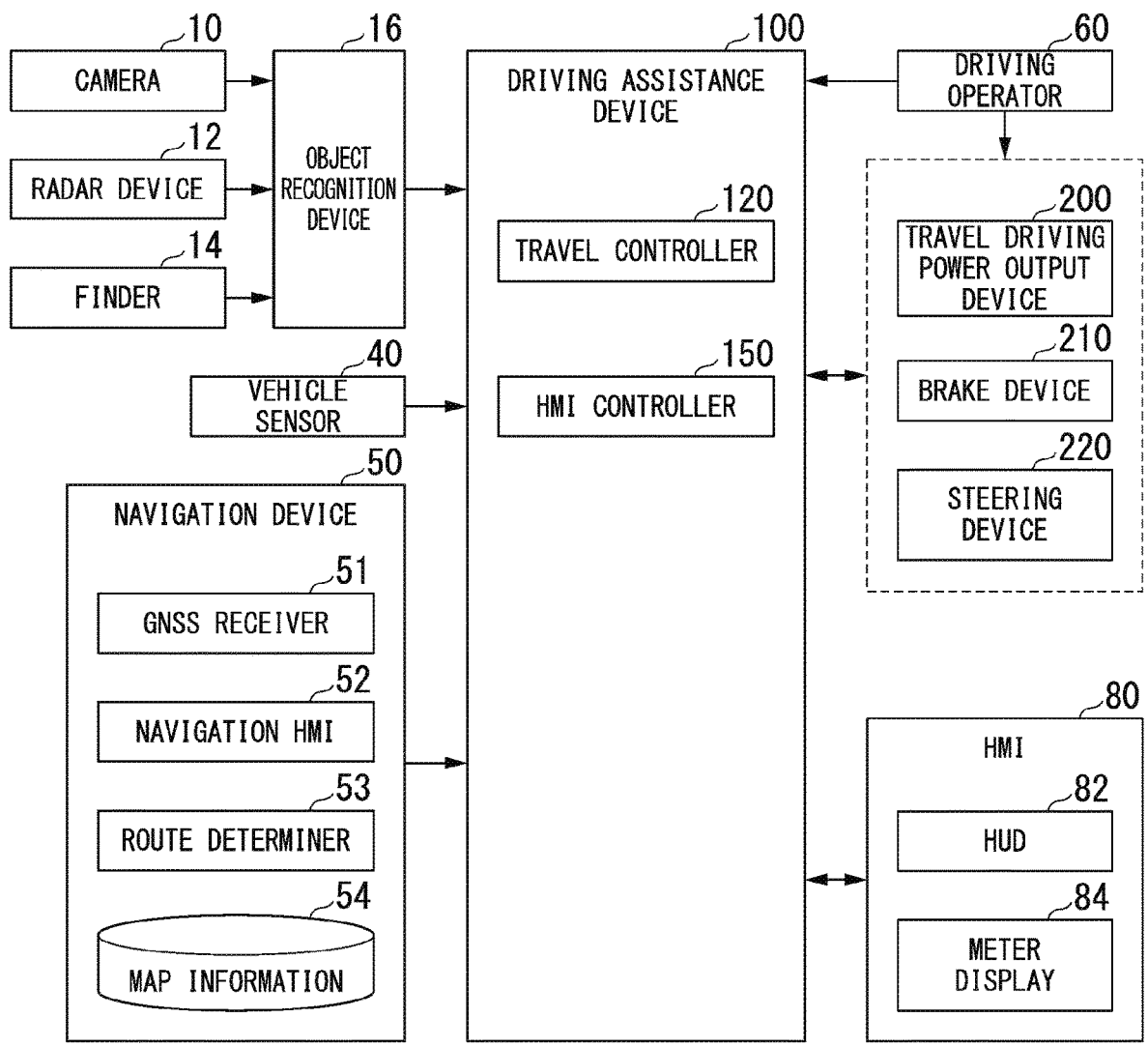
FIG. 1 is a block diagram of a vehicle system including a display system of an embodiment.

FIG. 1 is block diagram of a vehicle system 1 including a display system of an embodiment. A vehicle equipped with the vehicle system 1 (hereinafter referred to as a vehicle M) is, for example, a two-wheeled, three-wheeled, four-wheeled vehicle or the like and a driving source thereof includes an internal combustion engine such as a diesel engine or a gasoline engine, a motor or a combination thereof. The motor operates using power generated by a generator connected to the internal combustion engine or power discharged from a secondary battery or a fuel battery.

In FIG. 1, the vehicle system 1 includes, for example, a camera 10, a radar device 12, a finder 14, an object recognition device 16, a vehicle sensor 40, a navigation device 50, a driving operator 60, a human machine interface (HMI) 80, a driving assistance device 100, a travel driving power output device 200, a brake device 210, and a steering device 220. These devices and apparatuses are connected through a multiplex communication line such as a controller area network (CAN) communication line, a serial communication line, a wireless communication network, and the like. The configuration of the vehicle system 1 shown in FIG. 1 is merely an example and a part of the configuration may be omitted or other configurations may be further added. A combination of the navigation device 50, the HMI 80 and an HMI controller 150 is an example of a "display system." The HMI controller 150 is an example of a "display controller." A combination of a navigation HMI 52, an HUD 82 and a meter display 84 is an example of a "display." A combination of the object recognition device 16, the navigation device 50 and a surrounding situation recognizer which will be described later is an example of a "recognizer."

The camera 10 photographs the surroundings of the vehicle M to generate a captured image. The camera 10 is, for example, a digital camera using a solid state imaging device such as a charge coupled device (CCD) or a complementary metal oxide semiconductor (CMOS). The camera 10 is attached to any portion of the vehicle M in which the vehicle system 1 is mounted. The surroundings of the vehicle M include the front of the vehicle M and may include the side or back of the vehicle M. When a front view image of the vehicle M is captured, for example, the camera 10 is attached to the upper part of the front windshield, the rear side of a rear view mirror, or the like. The camera 10 may be a stereo camera.

The radar device 12 radiates electric waves such as millimeter waves in a predetermined radiation direction of the surroundings of the host vehicle M and detects electric waves (reflected waves) reflected by an object to detect the position (distance and direction) of the object. The object is, for example, another vehicle present around the vehicle M, an obstacle, a structure, or the like. One or a plurality of radar devices 12 are attached to any portions of the vehicle M. The radar device 12 may detect the position and speed of an object according to a frequency modulated continuous wave (FM-CW) method.

The finder 14 is a light detection and ranging or laser imaging detection and ranging (LIDAR) device which measures scattering light for radiated light radiated in a predetermination radiation direction of the surroundings of the vehicle M and detects a distance to an object. One or a plurality of finders 14 are attached to any portions of the vehicle M.

The object recognition device 16 performs a sensor fusion process on detection results of some or all of the camera 10, the radar device 12 and the finder 14 to recognize the position, type, speed and the like of an object present around the vehicle M. The object recognition device 16 may recognize road shapes around the vehicle M according to the sensor fusion process. The object recognition device 16 outputs a recognition result to the driving assistance device 100.

The vehicle sensor 40 includes, for example, a vehicle speed sensor that detects the speed (hereinafter referred to as a vehicle speed) of the vehicle M, an acceleration sensor that detects an acceleration, a yaw rate sensor that detects an angular velocity around a vertical axis, a heading sensor that detects the direction of the host vehicle M, etc. The vehicle sensor 40 may include a sensor that measures a driving power distribution ratio, an engine speed, and the like.

The navigation device 50 includes, for example, a global navigation satellite system (GNSS) receiver 51, a navigation HMI 52 and a route determiner 53 and stores map information 54 in a storage device such as a hard disk drive (HDD) or a flash memory. The map information 54 is information representing road shapes according to links indicating roads and nodes connected by links, for example. Links include a traffic message channel (TMC) link, for example. The TMC link is information for identifying a road section of a transmission target when an external server transmits traffic information to the vehicle M, for example, and is managed through an identification number that identifies each road section. The map information 54 may include link shapes, traffic regulations, road types, lane widths, the number of lanes, road structures, curvatures of roads, marking information, point of interest (POI) information, and the like. The marking information includes, for example, road names, road identification information, speed limit, traffic regulations (one-way, going straight lane, right-turn lane, and no parking), information about the end of a road (e.g., a region or a road), and the like. The map information 54 may include information on the centers of lanes, information on the boundaries of lanes, or the like, for example.

The GNSS receiver 51 identifies the position of the vehicle M on the basis of signals received from a GNSS satellite. The navigation HMI 52 includes a display device, a speaker, a touch panel, keys, etc. A part or all of the navigation HMI 52 and the HMI 80 which will be described later may be made to be common. The route determiner 53 determines a route (including information about stops while traveling to a destination) to a destination input by an occupant (including a driver) using the navigation HMI 52 from the position of the vehicle M identified by the GNSS receiver 51 (or any input position) and recommended lanes based on the route to the destination with reference to the map information 54, for example. For example, the route determiner 53 may divide a route on a map into a plurality of blocks (divides the route into intervals of 100 m in a vehicle traveling direction, for example) and determine a recommended lane for each block. The route determiner 53 performs, for example, determination in such a manner that on which lane from the left the vehicle will travel is determined. When a route on a map includes a branch point or a merging point, the route determiner 53 determines recommended lanes such that the vehicle M easily travels to a branch destination or a merging destination. The navigation device 50 performs route guidance using the navigation HMI 52 on the basis of the route determined by the route determiner 53 during operation.

The driving operator 60 is an operator for a driver to control the steering and speed of the vehicle M according to manual driving. The driving operator 60 includes, for example, an accelerator pedal, a brake pedal, a shift lever, a steering wheel, and the like.

The HMI 80 notifies an occupant of the vehicle M of various types of information and receives an input operation from the occupant. For example, the HMI 80 may include various display devices such as the HUD 82 and the meter display 84. The HMI 80 may include a speaker, a vibrator, a light-emitting unit, a buzzer, a microphone, various operating switches, keys, etc. For example, the HMI 80 may include an operator for switching start or end of operations of a travel controller 120 and the navigation device 50, an operator for selecting a display for displaying an image controlled by the HMI controller 150, and the like. The HMI 80 will be described in detail later.

The driving assistance device 100 includes, for example, the travel controller 120 and the HMI controller 150. When an instruction for starting the operation of the travel controller 120 is received from the HMI 80, the travel controller 120 performs driving assistance control of the vehicle M on the basis of information acquired from the object recognition device 16, the vehicle sensor 40 and the like until an instruction for ending the operation of the travel controller 120 is received or until the vehicle arrives at a destination. For example, when the travel controller 120 executes the ACC, the travel controller 120 controls the travel driving power output device 200 and the brake device 210 such that the vehicle M travels in a state in which a distance between the vehicle M and a preceding vehicle is maintained uniform on the basis of information input from the camera 10, the radar device 12 and the finder 14 through the object recognition device 16. That is, the travel controller 120 performs acceleration/deceleration control (speed control) based on a distance from a preceding vehicle. When the travel controller 120 executes the LKAS, the travel controller 120 controls the steering device 220 such that the vehicle M travels while keeping a lane in which the vehicle M is currently traveling (lane keep). That is, the driving assistance device 100 performs steering control for lane keep. When the travel controller 120 executes the CMBS, the travel controller 120 controls the travel driving power output device 200, the brake device 210 and the steering device 220 such that contact with an obstacle approaching the vehicle M is avoided. That is, the driving assistance device 100 performs acceleration/deceleration control and steering control for avoiding contact with an object.

The HMI controller 150 acquires an output of information from the HMI 80 and information received by the HMI 80 and performs control such as executing various processes on the basis of the acquired information. For example, the HMI controller 150 may cause the HMI 80 to display information about driving assistance for a driver in a predetermined display mode. The information about driving assistance may include, for example, information about road shapes of surroundings, specific information, operating states of driving assistance functions (e.g., ACC, LKAS and CMBS) executed by the driving assistance device 100, and the like. The specific information may be information about marking information, information about lane change, and information about recommended lanes, for example. The information about lane change may include, for example, lane change guidance information for announcing lane change to an occupant, lane change unnecessariness information for indicating that lane change is unnecessary to an occupant, and the like. The function of the HMI controller 150 will be described in detail later.

The travel driving power output device 200 outputs a travel driving power (torque) for traveling of the vehicle M to driving wheels. For example, the travel driving power output device 200 may include a combination of an internal combustion engine, a motor, a transmission and the like, and an electronic control unit (ECU) which controls these components. The brake device 210 includes a brake caliper, a cylinder which transfers a hydraulic pressure to the brake caliper, an electric motor which generates a hydraulic pressure in the cylinder, and a brake ECU, for example. The brake ECU controls the electric motor according to information input from the driving operator 60 or information input from the travel controller 120 such that a brake torque according to the control operation is output to each vehicle wheel. The steering device 220 includes a steering ECU and an electric motor, for example. The steering ECU drives the electric motor according to information input from the driving operator 60 or information input from the travel controller 120 to change the direction of the steering wheel.

[HMI]

Figure 2:
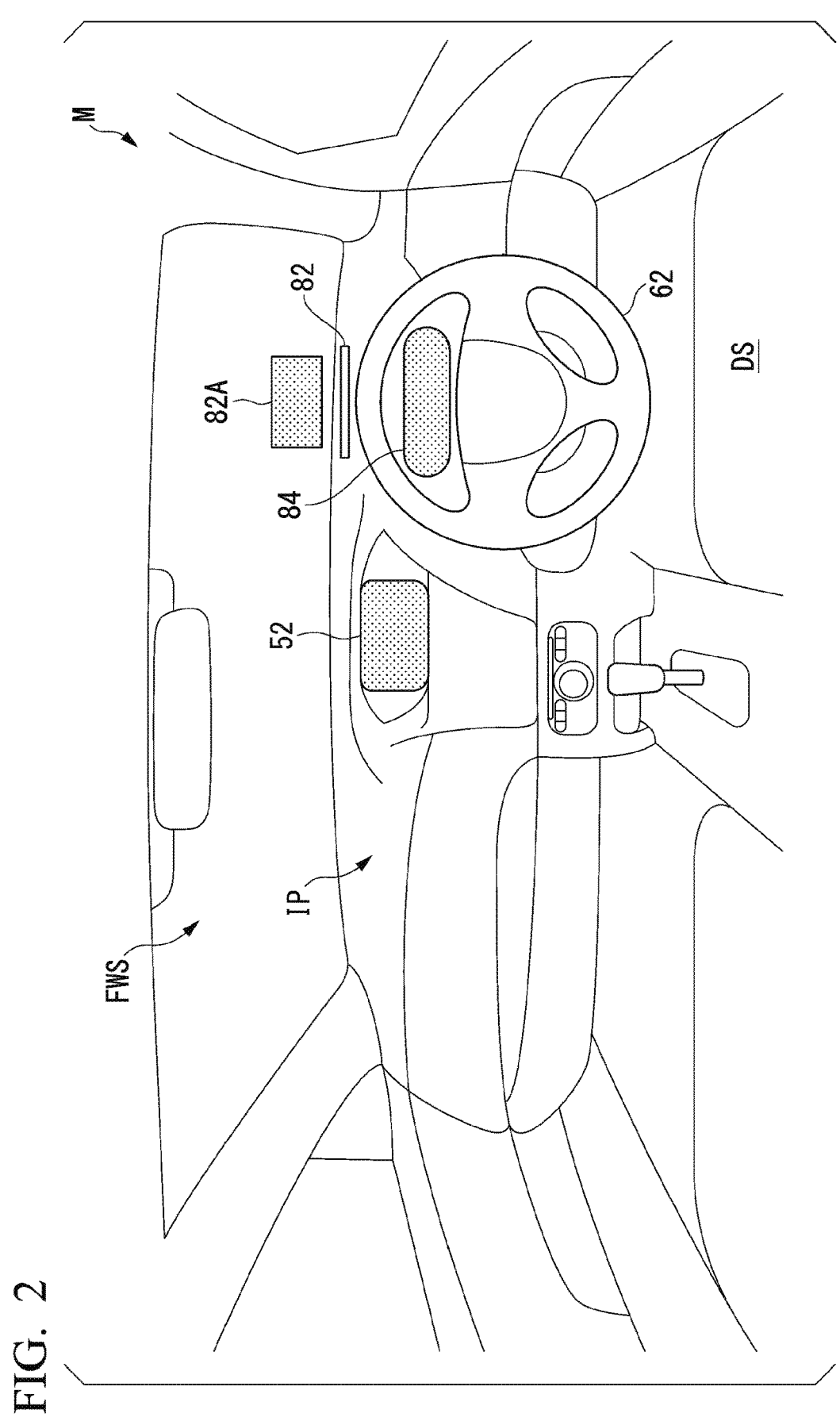
FIG. 2 is a diagram illustrating a state of a vehicle cabin of a vehicle M in which each part of an HMI is mounted.

Next, the HMI 80 will be described. FIG. 2 is a diagram illustrating a state of a vehicle cabin of the vehicle M in which each part of the HMI 80 is mounted. The navigation HMI 52 is a display device such as a liquid crystal display (LCD) or an organic electroluminescence (EL) display disposed at the center of an instrument panel IP, as shown in FIG. 2. The navigation HMI 52 includes, for example, a touch panel which receives an input operation according to touch of a finger of an occupant. The navigation HMI 52 displays road shapes of the surroundings of the vehicle M acquired from the map information 54, and a map and a route to a destination determined by the route determiner 53.

The navigation HMI 52 may display information about driving assistance, and the like in a display mode controlled by the HMI controller 150.

The HUD 82 is provided on or inside the instrument panel IP and allows a driver sitting on a driver's seat DS to visually recognize a virtual image by projecting light including an image to a display area 82A that is a part of a front windshield FWS in front of the driver's seat DS. The front windshield FWS is a member having optical transparency. The HUD 82 may be realized by a display device (e.g., a liquid crystal display or an organic EL display) having optical transparency attached to the front windshield FWS or may be one which projects light to a transparent member (a visor, lenses of glasses, or the like) included in a device worn on the body of a person or has a optically transparent display device attached thereto.

The HUD 82 allows the driver to visually recognize, for example, an image obtained by imaging the above-described information about driving assistance as a virtual image in a display mode controlled by the HMI controller 150. The HUD 82 may allow the driver to visually recognize images obtained by imaging a vehicle speed, a driving power distribution ratio, an engine speed, operating states of driving assistance functions (e.g., ACC, LKAS and CMBS), a shift position, and the like as virtual images in a display mode controlled by the HMI controller 150. In the following, it is assumed that there is a case in which causing, by the HMI controller 150, the HUD 82 to execute the above-described processing is referred to as "causing the HUD 82 to display an image."

The meter display 84 is a display device which is provided, for example, near the front of the driver's seat DS in the instrument panel IP and can be visually recognized by the driver through a hole in the steering wheel 62 that is an example of the driving operator 60 or over the steering wheel 62. For example, the meter display 84 may be a display device such as an LCD or an organic EL display. The meter display 84 may display, for example, meters such as a speedometer and technometer. The meter display 84 may display the above-described information about driving assistance in an area other than an area in which meters are displayed in a display mode controlled by the HMI controller 150.

[HMI Controller]

Figure 3:
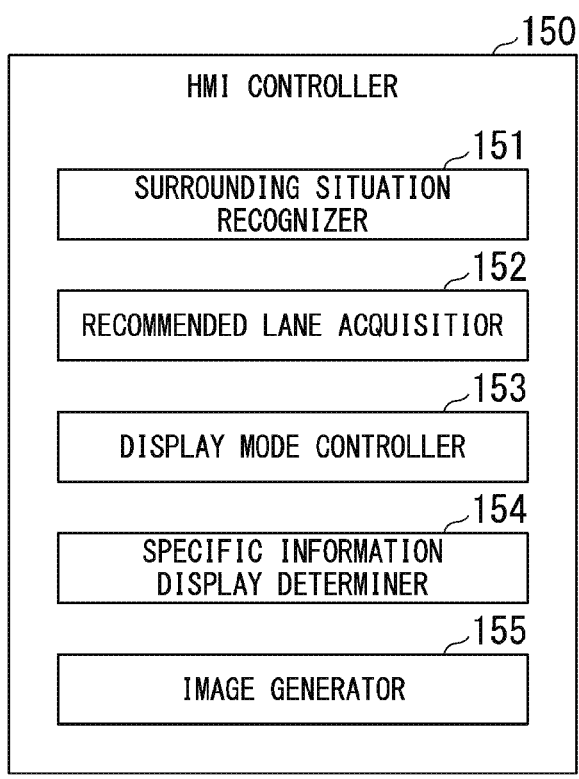
FIG. 3 is a functional block diagram of an HMI controller of an embodiment.

Next, a configuration example of the HMI controller 150 will be described. FIG. 3 is a functional block diagram of the HMI controller 150 of an embodiment. The HMI controller 150 includes, for example, a surrounding situation recognizer 151, a recommended lane acquisitior 152, a display mode controller 153, a specific information display determiner 154, and an image generator 155. These components are realized by, for example, a hardware processor such as a central processing unit (CPU) executing a program (software). Some or all of these components may be realized by hardware (circuit unit; including circuitry) such as a large scale integration (LSI) circuit, an application specific integrated circuit (ASIC), a field-programmable gate array (FPGA) and a graphics processing unit (GPU) or realized by software and hardware in cooperation.

The surrounding situation recognizer 151 recognizes surrounding situations of the vehicle M with reference to the map information 54 on the basis of positional information of the vehicle M identified by the GMSS receiver 51. Surrounding situations may include, for example, a range several links ahead of a link section in which the vehicle M is traveling. Information recognized as surrounding situations may include situations such as road shapes and the number of lanes in the surroundings of the vehicle M, a lane in which the vehicle M is traveling, and marking information, for example. Information recognized as surrounding situations may include information on a lane merging into a lane in which a vehicle can travel in the same direction as a traveling direction of the vehicle M or a branching lane among a plurality of lanes. In the following, a lane added according to merging into a lane (hereinafter referred to as a main line) in which a vehicle can travel in the same direction as a traveling direction of the vehicle M is referred to as an "added lane" and a lane branching from the main line is referred to as a "branch lane." The surrounding situation recognizer 151 may acquire a front view image of the vehicle M captured by the camera 10 instead of (or in addition to) acquisition from the map information 54 and analyze the acquired image to recognize lanes drawn on roads, lanes divided by a structure such as a median strip, the number of lanes, road shapes, travel lanes, and the like.

The recommended lane acquisitior 152 acquires information about a recommended lane determined by the route determiner 53 when the navigation device 50 is operating.

The display mode controller 153 controls a display mode of information about driving assistance. The display mode includes a target apparatus for which information will be displayed, a display start time, a display section, display details, and the like. The function of the display mode controller 153 will be described in detail later.

The specific information display determiner 154 determines whether it is necessary to display specific information among information about driving assistance on the basis of display conditions determined for each lane. Display conditions may be set for each piece of information to be displayed. Display conditions for information about marking information may be that an added lane is present, an added lane is a recommended lane, or the like, for example. Display conditions for information about a recommended lane may be that the navigation device 50 is operating and recommended lanes have been determined on the basis of a route to a destination, for example. Display conditions for lane change guidance information among information about lane change may be that the vehicle M does not travel in a recommended lane when the vehicle M has arrived at a display start time set in a travel lane, for example. Display conditions for lane change unnecessariness information among the information about lane change may be that the vehicle M has already traveled in a recommended lane before arriving at a lane change limit point that is a limit point for performing lane change, for example. These display conditions for specific information are not limited to the above-described conditions and may include other conditions (e.g., presence or absence of a branch and display instruction of an occupant).

The image generator 155 generates an image for displaying information about driving assistance in a display mode set by the display mode controller 153. When the specific information display determiner 154 determines that it is necessary to display the aforementioned specific information, the image generator 155 generates an image corresponding to the specific information in a display mode set by the display mode controller 153. The image generator 155 causes a display target apparatus set by the display mode controller 153 to display the generated image.

[Display Mode Controller]

Next, processing of the display mode controller 153 and a detailed example of an image generated by the image generator 155 in a display mode controlled by the display mode controller 153 will be described. In the following description, it is assumed that the HUD 82 is caused to display an image generated by the image generator 155. In the following description, it is assumed that a route for arriving at a destination set by an occupant through the navigation device 50 and a recommended lane based on the route have been determined.

Figure 4:
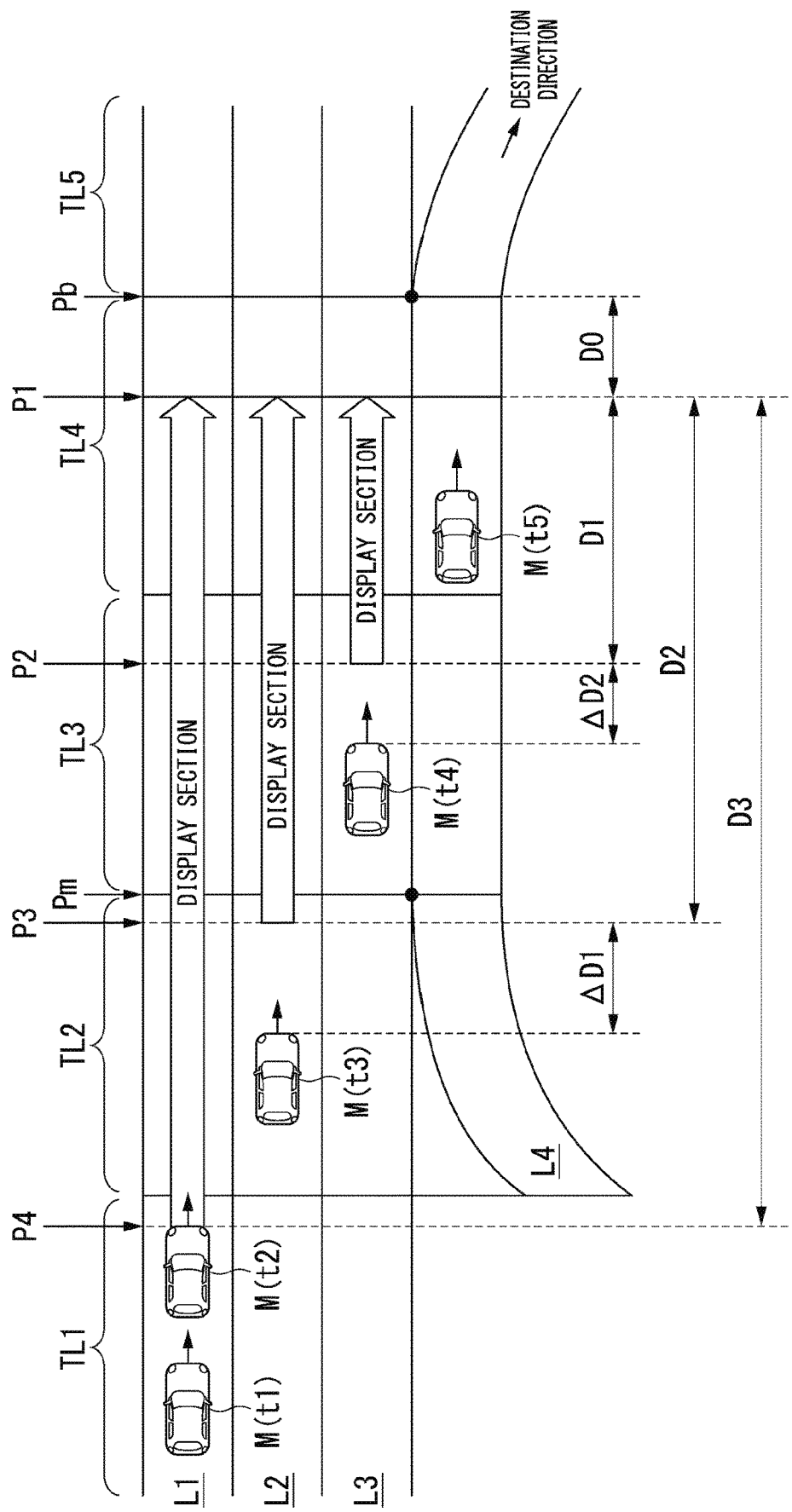
FIG. 4 is a diagram for describing processing of a display mode controller.

FIG. 4 is a diagram for describing processing of the display mode controller 153. It is assumed that the vehicle M travels on a road formed by four lanes L1 to L4 in the example of FIG. 4. The lanes L1 to L3 are lanes in which vehicles can travel in the same direction as the progress direction of the lanes and the lane L4 is a lane merging into the lanes L1 to L3 at a merging point Pm and branching from the lanes L1 to L3 at a branch point Pb. The lane L4 is an added lane when viewed from the lanes L1 to L3. In FIG. 4, it is assumed that a recommended lane for heading for a destination set through the navigation device 50 is the lane L4. In FIG. 4, TL1 to TL5 are identification information of TMC links. In FIG. 4, positions of the vehicle M at times t1 to t5 are represented by vehicle M(t1) to M(t5).

The display mode controller 153 sets a display mode with respect to a road shape. A display mode with respect to a road shape includes, for example, a display position of each lane included in a surrounding road shape of the vehicle M and the vehicle width.

The display mode controller 153 sets a display start time at which display of lane change guidance information for each lane is started on the basis of the number of lanes between a travel lane of the vehicle M and the recommended lane L4. Specifically, the display mode controller 153 sets display start times for the lanes L1 to L3 on the basis of the number of lanes between the lane L1 and the recommended lane L4 shown in FIG. 4.

For example, the display mode controller 153 may set a point a predetermined distance D0 ahead of the branch point Pb as a lane change limit point P1 that is a limit point for performing lane change for the lane L3 neighboring the recommended lane L4 on the basis of the position of the vehicle M. For example, the predetermined distance D0 may be changed on the basis of a vehicle speed detected by the vehicle sensor 40, a road shape and the like. Next, the display mode controller 153 sets a display start time in the lane L3 on the basis of a distance from the lane change limit point P1. For example, the display mode controller 153 may set a timing at which the vehicle M has arrived at a point P2 a predetermined distance D1 ahead of the lane change limit point P1 as a display start time in the lane L3.

The display mode controller 153 sets a timing at which the vehicle M has arrived at a point P3 a predetermined distance D2 ahead of the lane change limit point P1 as a display start time in the lane L2 for the lane L2 (lane L2 neighboring the lane L3) spaced apart from the recommended lane L4 by two lanes. The predetermined distance D2 is a distance twice the predetermined distance D1. The display mode controller 153 sets a timing at which the vehicle M has arrived at a point P4 a predetermined distance D3 ahead of the lane change limit point P1 as a display start time in the lane L1 for the lane L1 (lane L1 neighboring the lane L2) spaced apart from the recommended lane L4 by three lanes. For example, the predetermined distance D3 may be three times the predetermined distance D1. That is, the display mode controller 153 increases a distance from the lane change limit point P1 at a predetermined interval as the travel lane of the vehicle M becomes farther apart from the recommended lane and sets a display start time for each lane. The predetermined interval may be a regular interval based on the predetermined distance D1, for example. In this manner, the display mode controller 153 can display lane change guidance information at an appropriate timing for each lane by increasing a display start time for each lane in association with the number of lanes between a recommended lane and a travel lane.

The display mode controller 153 sets a section (display section) in which lane change guidance information will be displayed for each lane. For example, the display mode controller 153 may set an interval from when the vehicle M has arrived at a display start time set for each lane to when the vehicle M arrives at the lane change limit point P1 as a display section. The display mode controller 153 sets display start times, display sections, display positions and the like with respect to specific information such as marking information other than the lane change guidance information and information about recommended lanes.

The image generator 155 generates an image to be displayed by the HUD 82 on the basis of a display mode set by the display mode controller 153. Hereinafter, a display mode set by the display mode controller 153 using an image generated by the image generator 155 in respective situations of times t1 to t5 will be described.

<Situation at Time t1>

Figure 5:
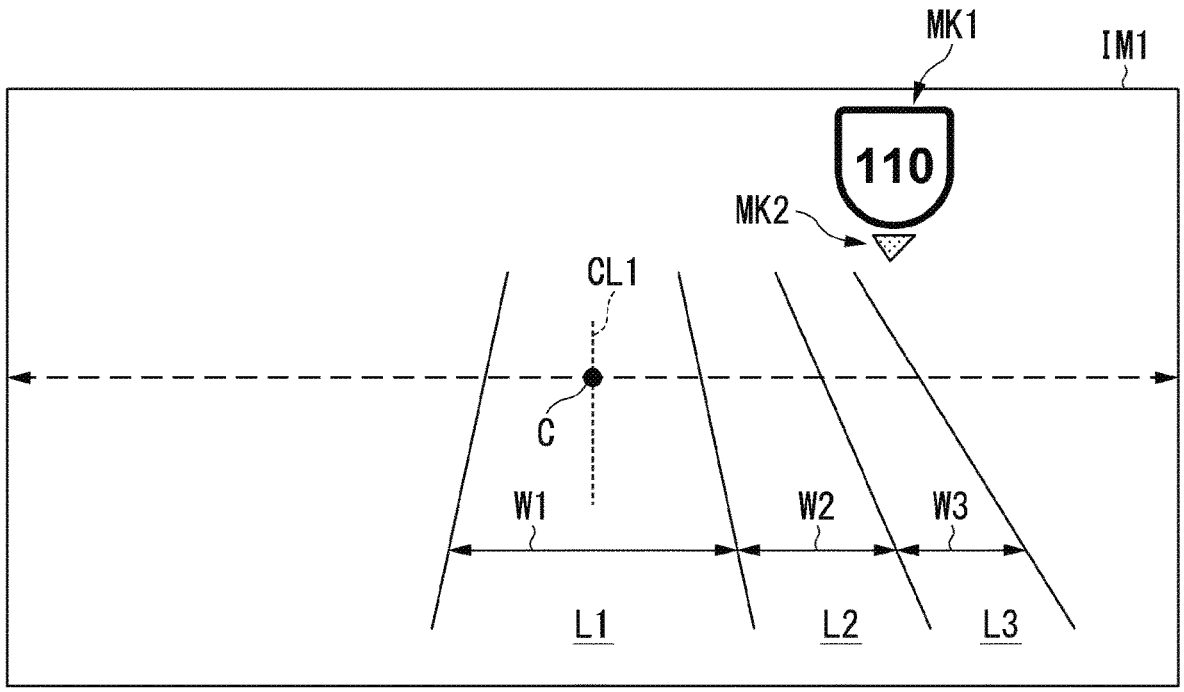
FIG. 5 is a diagram showing an example of an image generated by an image generator.

FIG. 5 is a diagram showing an example of an image IM1 generated by the image generator 155 in a situation at the time t1. In the example of FIG. 5, it is assumed that the size of the image IM1 is the same as the size of the display area 82A. The same applies to the sizes of other images which will be described below. For example, the vehicle M(t1) has not arrived at a display start time set in the lane L1 in the situation at the time t1. Accordingly, the display mode controller 153 causes the HUD 82 to display only an image about a road shape. Specifically, as shown in FIG. 5, the display mode controller 153 causes the image generator 155 to generate an image in which a plurality of lanes L1 to L3 included in a surrounding road shape are arranged such that the center line CL1 of the travel lane L1 of the vehicle M among the three lanes L1 to L3 is overlaid on the center C of the display area 82A (image (IM1) in the width direction. Overlying of the center line CL1 on the center C may include a predetermined permissible tolerance on the basis of, for example, the number of lanes, a road shape (e.g., a curved road), the size of the display area 82A and the like.

For example, the display mode controller 153 may display the width W1 of the lane L1 positioned at the center C of the display area 82A in the width direction wider than the widths W2 and W3 of other lanes and display the width of a lane spaced apart outward from the center C narrower for the widths W1 to W3 of the lanes L1 to L3 in the image. In this case, the display mode controller 153 sets the widths of lanes to become gradually narrower with increasing distance outward from the center C. Specifically, as shown in FIG. 5, the display mode controller 153 displays the width W2 of the lane L2 positioned on the outside the lane L1 narrower than the width W1 and displays the width W3 of the lane L3 positioned on the outside the lane L2 narrower than the width W2.

The display mode controller 153 updates and displays the above-described image of the lanes L1 to L3 at a predetermined timing. The predetermined timing includes, for example, a timing at which the vehicle M has traveled a predetermined distance, a timing at which a predetermined time has elapsed, a timing at which roads or road links (e.g., identification information of TMC links) are switched, a timing at which lane change is performed, and the like. For example, the predetermined timing may include a timing at which presence of branching, merging or the like of a road several links ahead has been recognized.

In the situation at the time t1, the lane L4 merges as an added lane of the lanes L1 to L3 at the end of the next link section TL2. Accordingly, the display mode controller 153 displays an image about the lane L4 outside the image of the lanes L1 to L3 which represents the road shape on the side on which the lane L4 is added prior to displaying the shape of the lane L4. An image about an added lane includes an image of identification information associated with the added lane.

For example, the display mode controller 153 may display a sign mark MK1 indicating identification information of the lane L4 outside the image of the lane L3 which is a merging side as an example of marking information, as shown in FIG. 5. The display mode controller 153 may display an indication mark MK2 indicating a target lane of the sign mark MK1 along with display of the sign mark MK1. It is possible to allow an occupant to ascertain information on the lane L4 before the shape of the lane L4 is displayed by displaying the indication mark MK2. Accordingly, it is possible to allow the occupant to ascertain information about a lane which will be added in the near future as well as a road shape around the vehicle with time to spare.

When an added lane is not a lane in which the vehicle M actually travels or a lane in which the vehicle M is scheduled to travel, unnecessary information may be displayed. Therefore, the display mode controller 153 may display images of the sign mark MK1 and the indication mark MK2 when a recommended lane associated with a route to a destination determined by the route determiner 53 is an added lane as a display condition of the sign mark MK1 and the indication mark MK2. Accordingly, only information necessary for traveling to the destination can be displayed. It is possible to allow an occupant to easily recognize other displayed details by eliminating display of unnecessary information.

<Situation at Time t2>

In a situation at the time t2, lane change guidance information display conditions are satisfied because the vehicle M(t2) has arrived at the display start time (point P4) of the lane L1 and is not traveling in the recommended lane L4. Accordingly, the display mode controller 153 causes the image generator 155 to generate a lane change mark (an example of a guidance image) MK3 that indicates a direction of a recommended lane with respect to the travel lane of the vehicle M and prompts a driver to perform lane change as an example of lane change guidance information and causes the HUD 82 to display the generated image along with an image of a road shape around the vehicle M. At the point in time t2, the image indicating the shape of the lane L4 is not displayed. Accordingly, the display mode controller 153 sets the lane L3 neighboring the lane L4 as a temporary target lane and displays the lane change mark MK3 that indicates the direction of the target lane and prompts the driver to perform lane change when the vehicle M needs to move from the travel lane to the lane L4 and the image indicating the shape of the lane L4 is not displayed.

Figure 6:
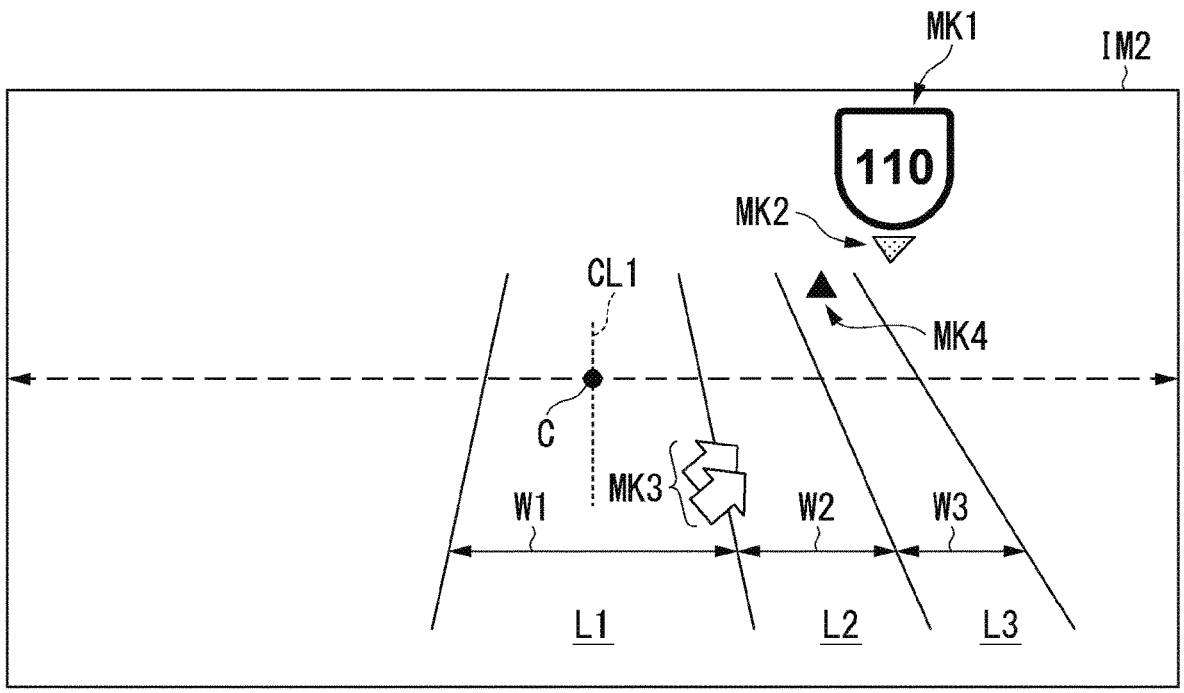
FIG. 6 is a diagram showing an example of an image generated by the image generator.

FIG. 6 is a diagram showing an example of an image IM2 generated by the image generator 155 in the situation at the time t2. The lane change mark MK3 is displayed, for example, as an arrow mark or a mark, a shape, character information or the like indicating a direction. In the image IM2 of FIG. 6, the lane change mark MK3 in which two arrows indicate a lane change destination and parts thereof overlap is displayed. In addition, the display mode controller 153 displays the lane change mark MK3 on a division line between the lane L1 that is the travel lane and the lane L2 that is a lane change destination lane. An occupant can easily recognize that it is necessary to change lanes in order to move to the destination by visually recognizing the lane change mark MK3 displayed by the HUD 82.

The display mode controller 153 may display a recommended lane mark MK4 indicating a recommended lane based on a route to a destination set by the navigation device 50 or a temporary target lane at a position associated with the recommended lane. In the image IM2 of FIG. 6, the recommended lane mark MK4 is displayed on the image of the lane L3 that is a temporary target lane (the upper part of the image of the lane L3) because information about the shape of the lane L4 is not displayed. Accordingly, the occupant can easily recognize the recommended lane or the temporary target lane and thus can smoothly change lanes.

<Situation at Time t3>

In a situation at the time t3, it is assumed that lane change from the lane L1 is performed and the vehicle M(t3) is traveling in the lane L2. In this situation, the specific information display determiner 154 determines whether display conditions for the lane change mark MK3 set in the lane L2 are satisfied. At the time t3, the specific information display determiner 154 determines that it is not necessary to display the lane change mark MK3 because the vehicle M(t3) has not arrived at the display start time (point P3) of the lane L2. However, if display of the lane change mark MK3 disappears from the screen in a section AD1 from the position of the vehicle M(t3) to the display start time, the occupant may misunderstand that they can arrive at a destination despite the current lane L2 and thus the occupant is likely to be in a state in which they do not change lanes even at a timing at which lane change can be performed. There is a possibility that the driver is confused if the vehicle M arrives at the display start time of the lane L2 and thus the lane change mark MK3 is displayed again and a situation in which lane change cannot be performed due to the influence of a neighboring vehicle is brought about.

Accordingly, when the vehicle M has started lane change, the display mode controller 153 continuously displays the lane change mark MK3 without inquiring whether the vehicle M has arrived at a display start point set for each lane (or is traveling in a displayed section). For example, when lane change to the lane L2 has been performed after the lane change mark MK3 has been displayed while the vehicle M is traveling in the lane L1, the display mode controller 153 continuously displays the lane change mark MK3 even when the vehicle M has not arrived at the display start time set in the lane L2 after lane change. In this case, the display mode controller 153 determines that lane change has been performed, for example, when a travel lane recognized by the surrounding situation recognizer 151 has been changed. The display mode controller 153 may determine that lane change has been performed when traveling across lanes has been recognized from results of analysis of a capture image captured by the camera 10. The display mode controller 153 may determine whether lane change has been performed on the basis of variations such as a vehicle speed, an angular velocity, an orientation and the like and road shapes detected by the vehicle sensor 40.

Figure 7:
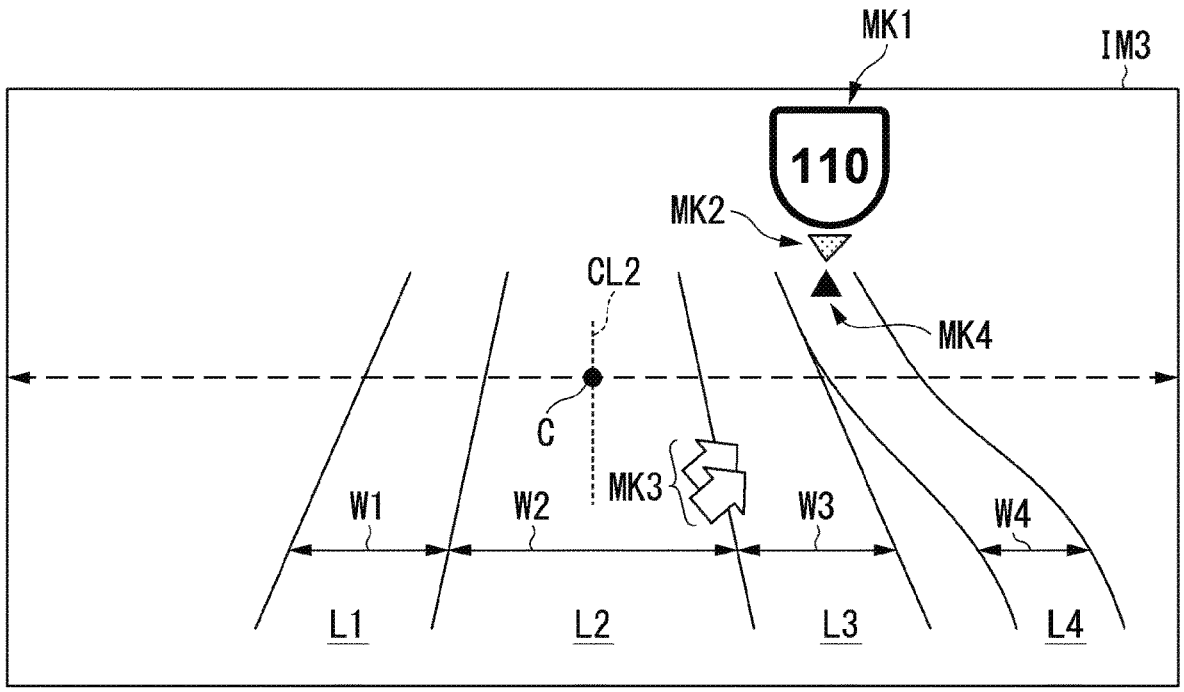
FIG. 7 is a diagram showing an example of an image generated by the image generator.

FIG. 7 is a diagram showing an example of an image IM3 generated by the image generator 155 in a situation at the time t3. In the example of FIG. 7, an image in which a plurality of lanes L1 to L4 included in a surrounding road shape are arranged such that the center line CL2 of the lane L2 is overlaid on the center C of the display area 82A (image IM3) in the width direction because the vehicle M(t3) is traveling in the lane L2 is generated. The display mode controller 153 displays a lane line shape change image in which the road shape of the lane L4 has been changed to a curve instead of a straight line, as shown in FIG. 7, in order to allow the occupant to recognize that the lane L4 merges into the lanes L1 to L3 to be an added lane. With respect to the width of each lane, the width W2 is greater than the widths W1, W3 and W4 and the widths W1 and W3 are greater than the width W4. The display mode controller 153 displays the sign mark MK1, the indication mark MK2 and the recommended lane mark MK4 in association with a display position of the image of the road shape of the lane L4 in which the vehicle can travel in the destination direction.

When the display mode controller 153 continuously displays the lane change mark MK3, the display mode controller 153 moves the lane change mark MK3 to a division line between the current travel lane of the vehicle M and a lane that is a new lane change destination and displays the lane change mark MK thereon. That is, the display mode controller 153 continuously displays the lane change mark MK3 while moving a display position of the lane change mark MK3 in stages toward a recommended lane whenever the travel lane of the vehicle M is changed according to lane change. In the image IM3 of FIG. 7, the lane change mark MK3 is displayed on the division line between the travel lane L2 and the lane L3 that is a lane change destination. Accordingly, it is possible to allow the occupant to correctly ascertain a lane that is a lane change destination. It is possible to allow the occupant to smoothly perform a plurality of lane changes because the lane change mark MK3 is continuously displayed.

<Situation at Time t4>

In a situation at the time t4, it is assumed that lane change from the lane L2 is performed and the vehicle M(t4) is traveling in the lane L3. In this situation, the specific information display determiner 154 determines whether display conditions for the lane change mark MK3 set in the lane L3 are satisfied and determines that it is not necessary to display the lane change mark MK3. However, if display of the lane change mark MK3 disappears from the screen in a section ΔD2 from the position of the vehicle M(t4) to the display start time, the same problem as that in the above-described situation at the time t3 occurs. Accordingly, the display mode controller 153 continuously displays the lane change mark MK3 even when the vehicle has not arrived at the display start time set in the lane L3.

Figure 8:
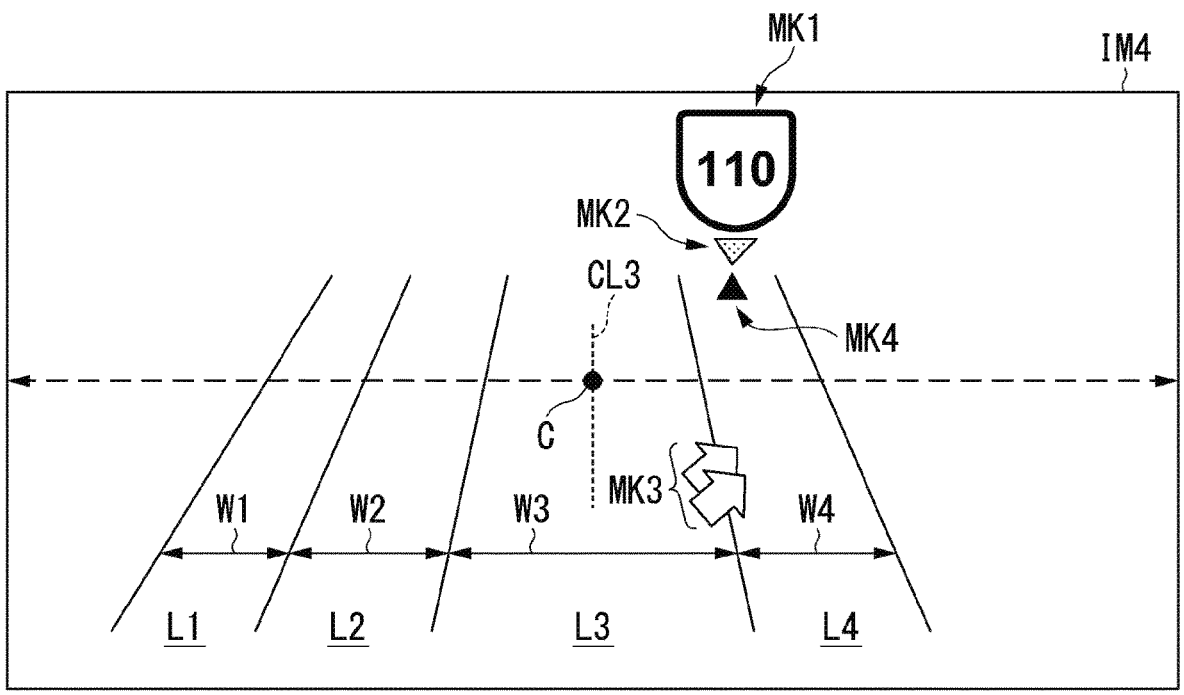
FIG. 8 is a diagram showing an example of an image generated by the image generator.

FIG. 8 is a diagram showing an example of an image IM4 generated by the image generator 155 in a situation at the time t4. In the example of FIG. 8, an image in which a plurality of lanes L1 to L4 included in a surrounding road shape are arranged such that the center line CL3 of the lane L3 is overlaid on the center C of the display area 82A (image IM4) in the width direction is generated because the vehicle M(t4) is traveling in the lane L3. At the time t4, the road shape of the lane L4 is a straight line and thus an image in the straight-line shape is displayed. With respect to the width of each lane, the width W3 is greater than the widths W1, W2 and W4 and the widths W2 and W4 are greater than the width W1.

In the image IM4 of FIG. 8, the lane change mark MK3 is displayed on the division line between the travel lane L3 and the lane L4 that is a lane change destination. Accordingly, the occupant can correctly ascertain a lane that is a lane change destination. The occupant can smoothly perform a plurality of lane changes because the lane change mark MK3 is continuously displayed.

Although the lane change mark MK3 in the same shape is shown in FIGS. 6 to 8, instead of this, the lane change mark MK3 may be changed on the basis of the number of lanes from a travel lane to a recommended lane (in other words, the number of times of remaining lane changes).

Figure 9:
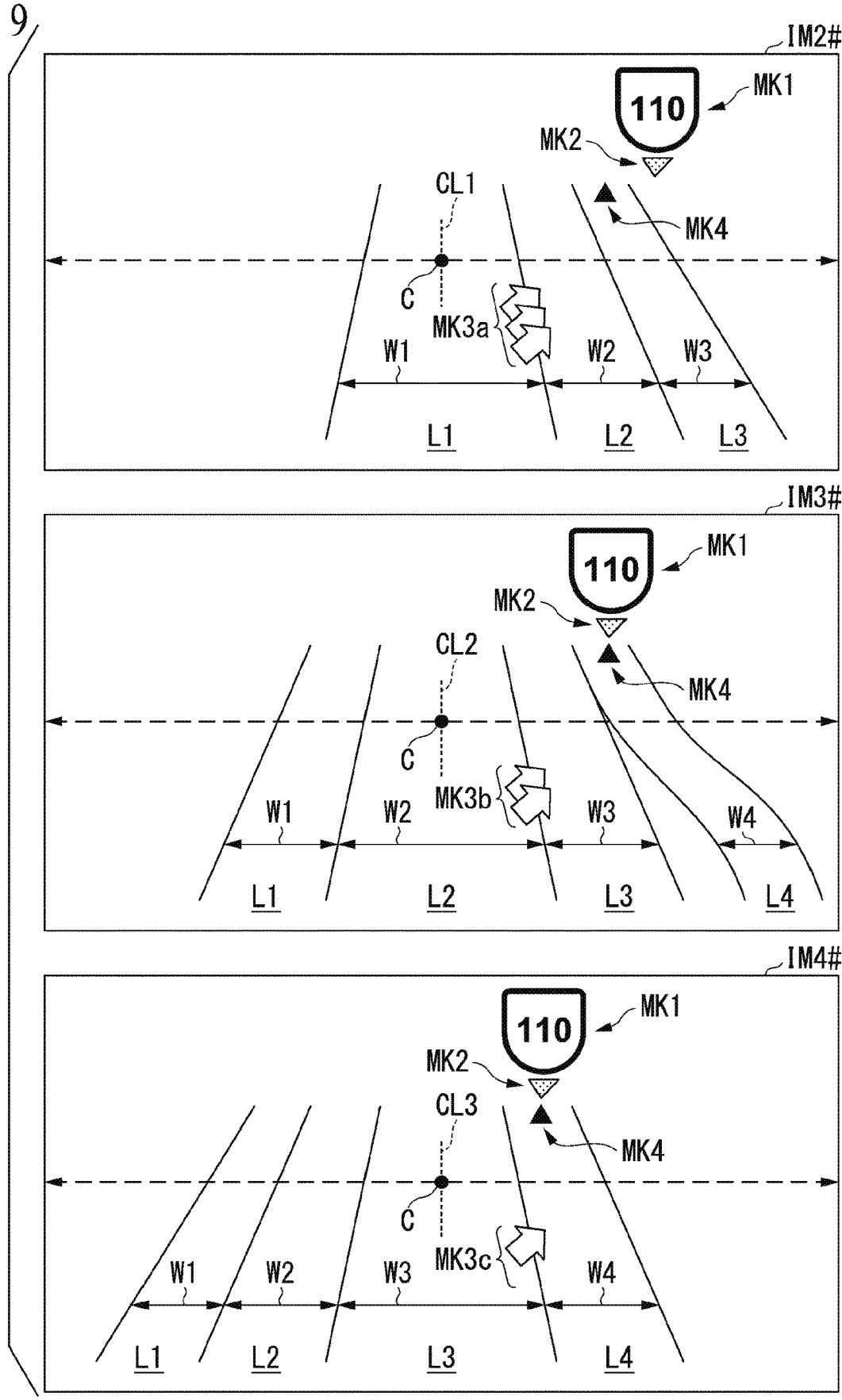
FIG. 9 is a diagram for describing a state in which a shape of a lane change mark is changed and displayed.

FIG. 9 is a diagram for describing a state in which the shape of the lane change mark MK3 is changed and displayed. Images IM2# to IM4# shown in FIG. 9 are images displayed by the HUD 82 in the situations at the times t2 to t4. In the situation at the time t2, the vehicle M(t2) is traveling in the lane L1 and the number of times of remaining lane changes to the lane L4 is three. Accordingly, the display mode controller 153 displays a lane change mark MK3a in which all of three arrow marks indicate a lane change destination and parts of the three arrows overlap, as shown in the image IM2# of FIG. 9. In the situation at the time t3, the vehicle M(t3) is traveling in the lane L2 and the number of times of remaining lane changes to the lane L4 is two. Accordingly, the display mode controller 153 displays a lane change mark MK3b in which all of two arrow marks indicate a lane change destination and parts of the two arrows overlap, as shown in the image IM3# of FIG. 9. In the situation at the time t4, the vehicle M(t4) is traveling in the lane L3 and the number of times of remaining lane changes to the lane L4 is one. Accordingly, the display mode controller 153 displays a lane change mark MK3c in which one arrow mark indicates a lane change destination, as shown in the image IM4# of FIG. 9. Accordingly, the occupant can correctly recognize the number of times of remaining lane changes through the lane change mark and thus can perform smooth lane change with time to spare.

<Situation at Time t5>

Figure 10:
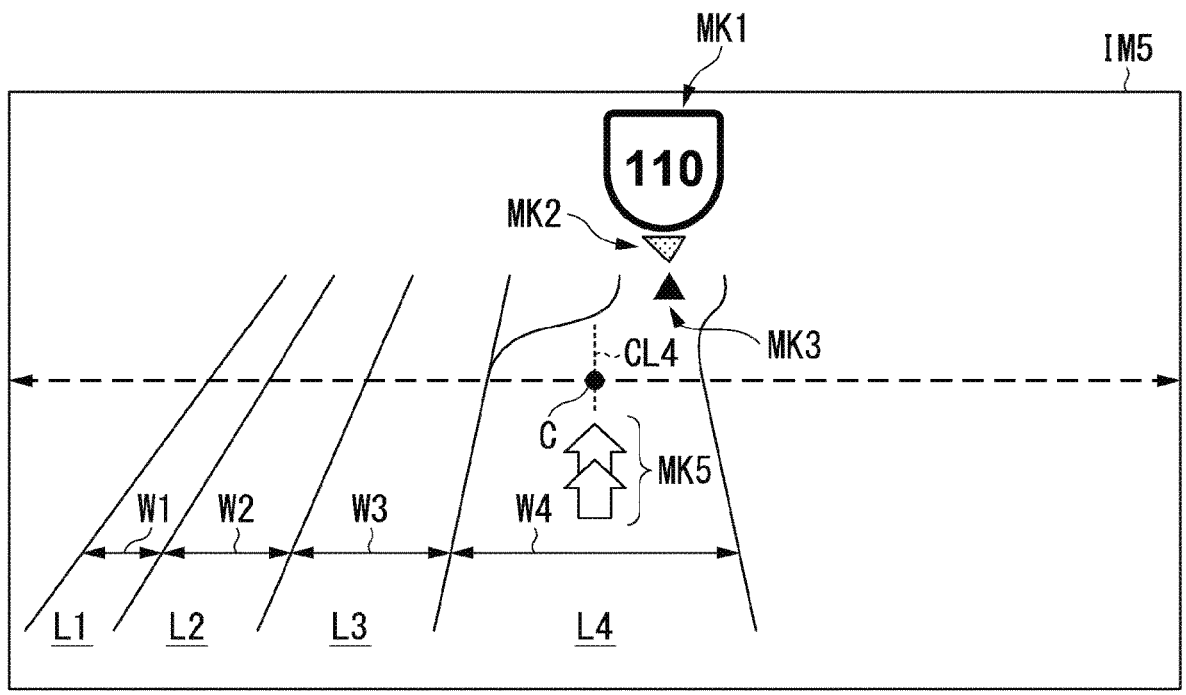
FIG. 10 is a diagram showing an example of an image generated by the image generator.

In a situation at the time t5, it is assumed that the vehicle M is traveling in the recommended lane L4 before the vehicle M(t5) arrives at the lane change limit point P1. In this situation, the display mode controller 153 may display an image representing lane change unnecessariness information. FIG. 10 is a diagram showing an example of an image IM5 generated by the image generator 155 in the situation at the time t5. In the example of FIG. 10, an image in which a plurality of lanes included in a surrounding road shape are arranged such that the center line CL4 of the lane L4 is overlaid on the center C of the display area 82A (image IM5) in the width direction because the vehicle M is traveling in the lane L4 is generated. The display mode controller 153 displays a lane line shape change image in which a road shape near the front end of the lane L4 has been changed to a curve instead of a straight line, as shown in FIG. 10, in order to allow the occupant to recognize that the lane L4 branches from the lanes L1 to L3 in the next link section TL5. With respect to the width of each lane, the width W4 is greater than the widths W1 to W3, the width W3 is greater than the widths W1 and W2, and the width W2 is greater than the width W1.

In the situation at the time t5, the display mode controller 153 causes the image generator 155 to generate a lane change unnecessariness mark MK5 as an example of an image representing lane change unnecessariness information and displays the generated lane change unnecessariness mark MK5 on the lane L4. The lane change unnecessariness mark MK5 is displayed as an arrow mark or a mark, a shape, character information or the like indicating another direction such that the occupant easily recognizes traveling along the lane L4. In the image IM5 shown in FIG. 8, the lane change unnecessariness mark MK5 in which parts of two arrows overlap and each arrow indicates an extending direction of a road is displayed. The occupant can easily recognize that it is not necessary to change lanes by displaying the lane change unnecessariness mark MK5.

When the vehicle M is traveling in the lanes L1 to L3 at a time when the vehicle M arrives at the lane change limit point P1, the display mode controller 153 ends display of the lane change mark MK3. The display mode controller 153 may end display of the lane change mark MK3 when the vehicle M is traveling in the lanes L1 to L3 at a time when the vehicle M arrives at a branch point P0. Accordingly, the display mode controller 153 can prevent urging the occupant to change lanes in a situation in which lane change cannot be performed. When display of the lane change mark MK3 ends according to the above-described processing, the display mode controller 153 resets a display mode of information about driving assistance, and the like on the basis of a recommended lane of a route determined by the navigation device 50 again and a travel lane.

The display mode controller 153 may end display of the lane change unnecessariness mark MK5 when the vehicle M is traveling in the lane L4 at a time at which the vehicle M arrives at the lane change limit point P1.

Layouts such as display positions, sizes and shapes of the above-described images of road shapes and specific information (the sign mark MK1, the indication mark MK2, the lane change mark MK3, the recommended lane mark MK4 and the lane change unnecessariness mark MK5) are not limited to the examples of the above-described images. For example, some or all of information included in an image may be displayed as animation images.

The display mode controller 153 may display an image representing the driving assistance function when the driving assistance function is executed. When lane change is not performed even after a predetermined time elapses from display of the lane change mark MK3, for example, the display mode controller 153 may cause a speaker of the HMI 80 to output audio information or warning sound for causing lane change to be executed or cause vibrator to vibrate to perform control for making a driver notice displayed details.

The display mode controller 153 ends display of specific information at a predetermined timing. The predetermined timing is a timing at which the vehicle M has passed through a merging point, a branch point, a lane change limit point or the like, a timing at which a predetermined time has elapsed from display of specific information, a timing at which a display end instruction from an occupant is received through an operator of the HMI 80, or the like.

[Processing Flow]

Figure 11:
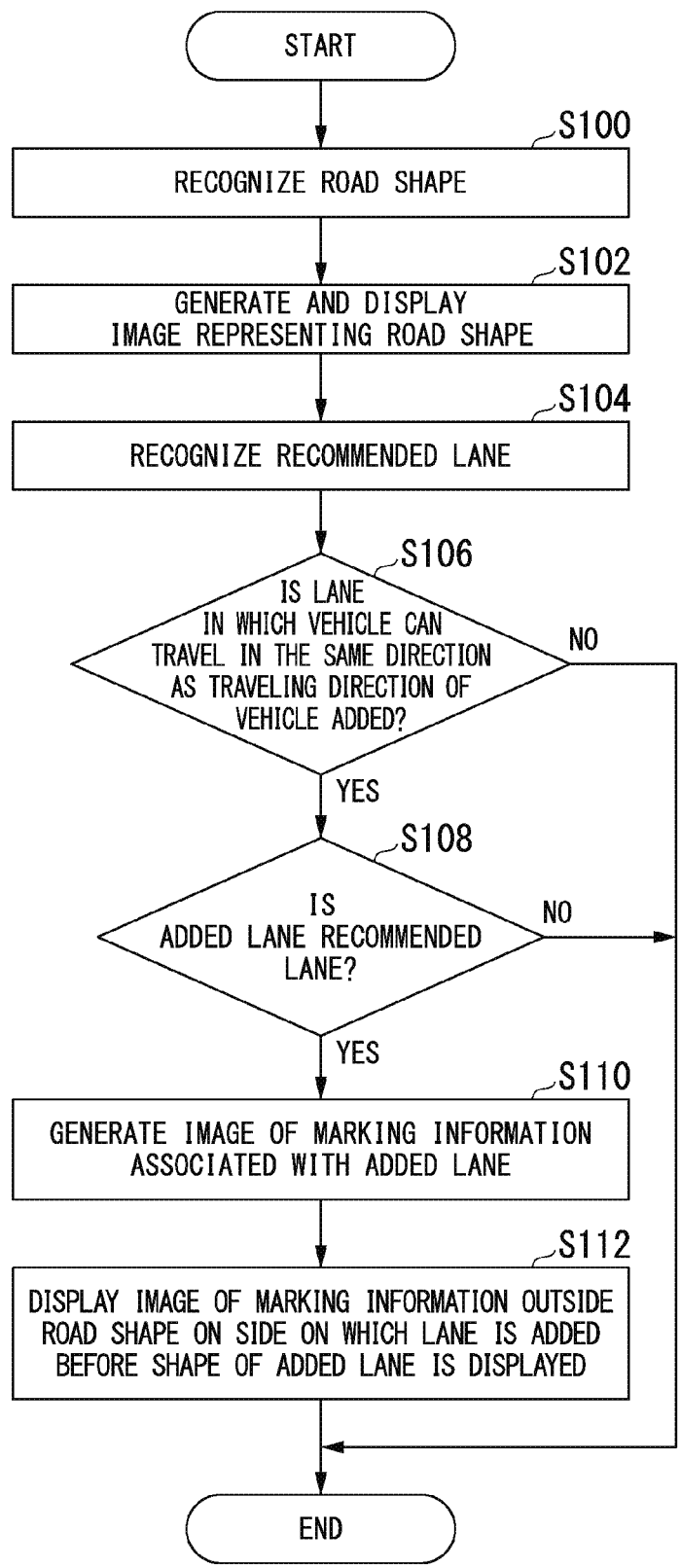
FIG. 11 is a flowchart showing an example of a processing flow executed by the display system of an embodiment.

FIG. 11 is a flowchart showing an example of a processing flow performed by the display system of an embodiment. Processing of this flowchart is repeatedly executed in a predetermined period, for example, while route guidance by the navigation device 50 is performed (the system is operating). In FIG. 11, processing for display marking information is mainly described. In the example of FIG. 11, the surrounding situation recognizer 151 recognizes a surrounding situation of the vehicle M and recognizes a road shape around the vehicle M (step S100). Next, the image generator 155 generates an image representing the recognized road shape in a display mode set by the display mode controller 153 and causes the HUD 82 to display the generated image (step S102).

Next, the recommended lane acquisitior 152 acquires a recommended lane based on a route to a destination determined by the navigation device 50 (step S104). Subsequently, the specific information display determiner 154 determines whether a lane in which the vehicle M can travel in the same direction as a traveling direction of the vehicle M is added (step S106). When a lane in which the vehicle M can travel in the same direction as the traveling direction of the vehicle M is added, the specific information display determiner 154 determines whether the added lane is the recommended lane (step S108). If the added lane is the recommended lane, the image generator 155 generates an image of marking information associated with the added lane on the basis of a display mode set by the display mode controller 153 (step S110) and displays the generated image of the marking information outside the road shape on the side on which the lane is added before the shape of the added lane is displayed (step S112). Accordingly, processing of this flowchart ends. When a lane in which the vehicle M can travel in the same direction as the traveling direction of the vehicle M is not added in processing of step S106 or the added lane is not the recommended lane in processing of step S108, processing of this flowchart ends.

In processing of the display system of the embodiment, processing for determining whether an added lane is a recommended lane is not performed and the image generator 155 may simply generate an image of marking information associated with an added lane if the added lane is present and display the generated image before the display mode controller 153 displays an image of the shape of the added lane. In the processing of the display system of the embodiment, it is possible to display other information determined by the specific information display determiner 154 to satisfy display conditions and to need to be displayed (e.g., information about lane change and information about a recommended lane) through the display mode controller 153 in addition to display of the marking information shown in FIG. 11.

According to the above-described embodiment, the surrounding situation recognizer 151 which recognizes a surrounding situation of the vehicle M, a display (the navigation HMI 52, the HUD 82 and the meter display 84) which displays images, and the HMI controller 150 which causes the display to display an image representing a road shape around the vehicle M recognized by the surrounding situation recognizer 151 are included, and when a lane in which the vehicle M can travel in the same direction as a travel direction of the vehicle M is added, the HMI controller 150 causes the display to display an image about the added lane outside the image representing the road shape on the side on which the lane is added before the display is caused to display an image representing the shape of the added lane, and thus an occupant can recognize a road situation at a more appropriate timing. Accordingly, the occupant can smoothly perform lane change to a recommended lane, for example, when lane change from a travel lane of the vehicle to the recommended lane is needed.

[Hardware Configuration]

Figure 12:
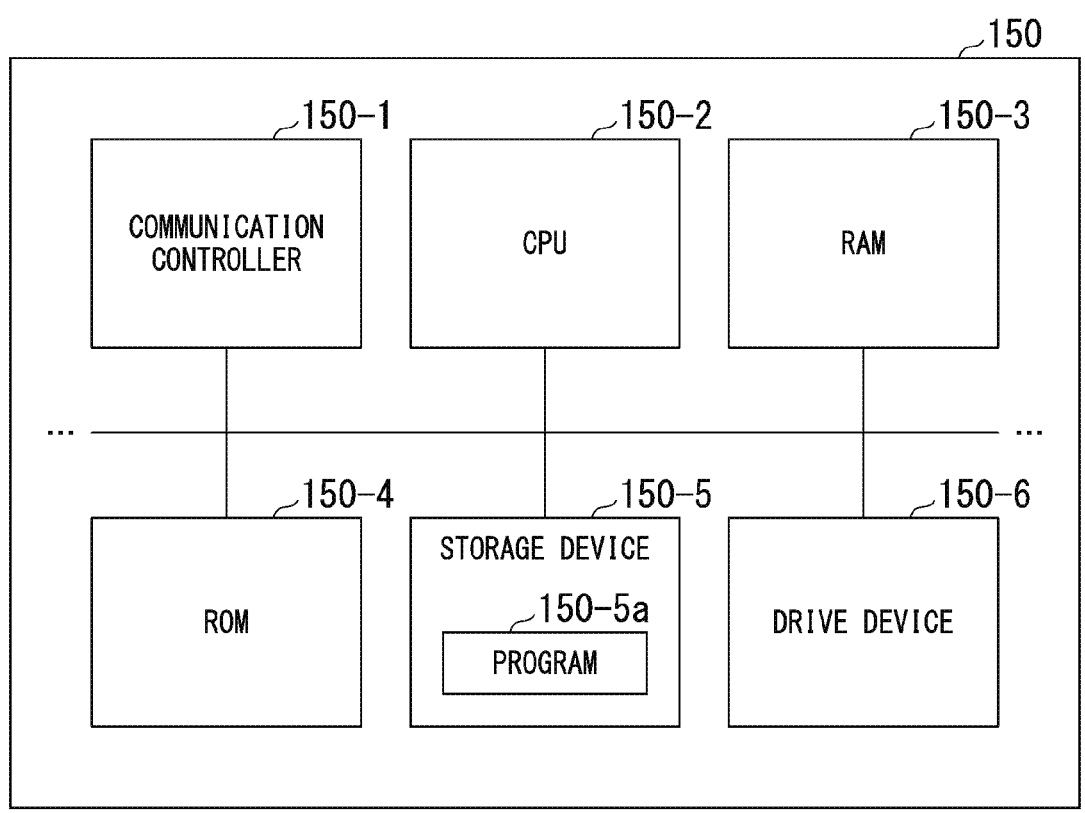
FIG. 12 is a diagram showing an example of a hardware configuration of the HMI controller of an embodiment.

The HMI controller 150 of the display system of the above-described embodiment may be realized by a computer hardware configuration shown in FIG. 12, for example. FIG. 12 is a diagram showing an example of a hardware configuration of the HMI controller 150 of an embodiment.

The HMI controller 150 has a configuration in which a communication controller 150-1, a CPU 150-2, a RAM 150-3, a ROM 150-4, a storage device 150-5 such as a flash memory or an HDD, and a drive device 150-6 are connected through an internal bus or a dedicated communication line. A portable storage medium such as an optical disc is mounted in the drive device 150-6. A program 150-5a stored in the storage device 150-5 is developed in the RAM 150-3 according to a DMA controller (not shown) or the like and executed by the CPU 150-2 to realize the functional unit of the HMI controller 150. In addition, a program referred to by the CPU 150-2 may be stored in the portable storage medium mounted in the drive device 150-6 or downloaded from other devices through a network NW.

The above-described embodiment can be represented as follows.

A display system including a storage device and a hardware processor which executes a program stored in the storage device, wherein the hardware processor is configured to, by executing the program:

recognize a surrounding situation of a vehicle;

cause a display to display an image representing a recognized road shape around the vehicle;

when a lane in which the vehicle is able to travel in the same direction as a traveling direction of the vehicle is added, cause the display to display an image about the added lane outside the image representing the road shape on the side on which the lane is added before an image representing the shape of the added lane is displayed.

While forms for embodying the present invention have been described using embodiments, the present invention is not limited to these embodiments and various modifications and substitutions can be made without departing from the spirit or scope of the present invention.

What is claimed is:

1. A display system comprising:
a memory; and
a processor, wherein the processor causes a recognizer to recognize a surrounding situation of a vehicle;
a display configured to display images; and
a display controller configured to cause the display to display an image representing a road shape around the vehicle,
wherein, when a lane is added in a same direction as a traveling direction of the vehicle, the display controller causes the display to display an image that represents the added lane, which is displayed on a side on which the lane is added and outside the image representing the road shape, wherein the display controller causes the display to display the image that represents the added lane before causing the display to display an image that represents a shape of the added lane
wherein the processor further causes a route determiner to determine a route to a destination of the vehicle,
wherein the display controller displays the image about the added lane when the added lane is a recommended lane associated with the route to the destination determined by the route determine,
wherein the display controller sets a lane neighboring the added lane as a target lane and displays a guidance image for guiding lane change of the vehicle when the vehicle needs to move from a lane in which the vehicle is traveling to the added lane and an image representing the shape of the added lane is not displayed, and
wherein the display controller sets a display start time of the guidance image for each lane on the basis of the number of lanes between a travel lane of the vehicle and the recommended lane, and when the vehicle has performed lane change after the guidance image has been displayed, continues display of the guidance image even when a display start time set in a lane after lane change has not been reached.

2. The display system according to claim 1, wherein the image about the added lane includes an image of marking information associated with the added lane.

3. The display system according to claim 1, wherein the display controller sets the display start time for each lane on the basis of a lane change limit point that is a limit point for performing lane change to the recommended lane for each of a plurality of lanes in which the vehicle is able to travel in the same direction as the traveling direction of the vehicle.

4. The display system according to claim 3, wherein the display controller ends display of the guidance image when the vehicle is not traveling in the recommended lane during display of the guidance image and the vehicle has arrived at the lane change limit point.

5. The display system according to claim 1, wherein the display controller causes the display to display an image representing that lane change of the vehicle is not necessary when the vehicle is traveling in the recommended lane.

6. A display control method, using a computer, comprising:

recognizing a surrounding situation of a vehicle;
causing a display to display a first image representing a recognized road shape around the vehicle;
when a lane is added in the same direction as a traveling direction of the vehicle, causing the display to display a second image that represents the added lane, the second image is displayed outside the first image and on a side of the first image on which the lane is added, wherein the second image is displayed before the display is caused to display a third image representing a shape of the added lane;
determining a route to a destination of the vehicle;
when the added lane is a recommended lane associated with the route to the destination, displaying the image about the added lane;
when the vehicle needs to move from a lane in which the vehicle is traveling to the added lane and an image representing the shape of the added lane is not displayed, setting a lane neighboring the added lane as a target lane and displaying a guidance image for guiding lane change of the vehicle;
setting a display start time of the guidance image for each lane on the basis of the number of lanes between a travel lane of the vehicle and the recommended lane; and
when the vehicle has performed lane change after the guidance image has been displayed, continuing the displaying of the guidance image even when a display start time set in a lane after lane change has not been reached.

7. The display control method of claim 6, wherein the image about the added lane includes an image of marking information associated with the added lane.

8. The display control method of claim 6, further comprising:

setting the display start time for each lane on the basis of a lane change limit point that is a limit point for performing lane change to the recommended lane for each of a plurality of lanes in which the vehicle is able to travel in the same direction as the traveling direction of the vehicle.

9. The display control method of claim 8, further comprising:

ending display of the guidance image when the vehicle is not traveling in the recommended lane during display of the guidance image and the vehicle has arrived at the lane change limit point.

10. The display control method of claim 6, further comprising:

displaying an image representing that lane change of the vehicle is not necessary when the vehicle is traveling in the recommended lane.

11. A non-transitory computer-readable medium storing a program causing a computer to:

recognize a surrounding situation of a vehicle;

cause a display to display an image representing a recognized road shape around the vehicle;

when a lane is added in the same direction as a traveling direction of the vehicle, cause the display to display an image that represents the added lane outside the image representing the road shape and on a side on which the lane is added, wherein the image that represents the added lane is displayed before the display is caused to display an image representing a shape of the added lane;

determine a route to a destination of the vehicle, display the image about the added lane when the added lane is a recommended lane associated with the route to the destination;

set a lane neighboring the added lane as a target lane and display a guidance image for guiding lane change of the vehicle when the vehicle needs to move from a lane in which the vehicle is traveling to the added lane and an image representing the shape of the added lane is not displayed;

set a display start time of the guidance image for each lane on the basis of the number of lanes between a travel lane of the vehicle and the recommended lane; and when the vehicle has performed lane change after the guidance image has been displayed, continue to display of the guidance image even when a display start time set in a lane after lane change has not been reached.

12. The non-transitory computer-readable medium of claim 11, wherein the image about the added lane includes an image of marking information associated with the added lane.

13. The non-transitory computer-readable medium of claim 11, wherein the program further causes the computer to set the display start time for each lane on the basis of a lane change limit point that is a limit point for performing lane change to the recommended lane for each of a plurality of lanes in which the vehicle is able to travel in the same direction as the traveling direction of the vehicle.

14. The non-transitory computer-readable medium of claim 13, wherein the program further causes the computer to end display of the guidance image when the vehicle is not traveling in the recommended lane during display of the guidance image and the vehicle has arrived at the lane change limit point.

15. The non-transitory computer-readable medium of claim 11, wherein the program further causes the computer to display an image representing that lane change of the vehicle is not necessary when the vehicle is traveling in the recommended lane.

* * * * *